United States Patent
Messick et al.

(10) Patent No.: US 11,181,961 B2
(45) Date of Patent: Nov. 23, 2021

(54) SYSTEM AND METHOD FOR INCREASING POWER DELIVERY TO INFORMATION HANDLING SYSTEMS

(71) Applicant: DELL PRODUCTS, LP, Round Rock, TX (US)

(72) Inventors: Doug E. Messick, Austin, TX (US); Aaron M. Rhinehart, Georgetown, TX (US); Ayedin Nikazm, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 16/842,248

(22) Filed: Apr. 7, 2020

(65) Prior Publication Data

US 2021/0311536 A1    Oct. 7, 2021

(51) Int. Cl.
*G06F 1/26* (2006.01)
*G06F 1/28* (2006.01)

(52) U.S. Cl.
CPC ............. *G06F 1/28* (2013.01); *G06F 1/263* (2013.01)

(58) Field of Classification Search
CPC .................................. G06F 1/28; G06F 1/263
See application file for complete search history.

(56) References Cited

U.S. PATENT DOCUMENTS

| | | | |
|---|---|---|---|
| 7,830,151 B2 | 11/2010 | Brukwicz et al. | |
| 9,218,033 B1 * | 12/2015 | Roy | G06F 1/263 |
| 9,583,936 B1 * | 2/2017 | Wishman | H02H 7/22 |
| 9,632,552 B2 | 4/2017 | Messick et al. | |
| 9,667,060 B1 * | 5/2017 | Sizikov | H02H 3/08 |
| 10,281,513 B1 * | 5/2019 | Goergen | H04L 12/10 |
| 2006/0161794 A1 * | 7/2006 | Chiasson | G06F 1/28 713/300 |
| 2007/0260896 A1 * | 11/2007 | Brundridge | G06F 1/3203 713/300 |
| 2008/0222435 A1 * | 9/2008 | Bolan | G06F 1/3203 713/310 |
| 2009/0282274 A1 * | 11/2009 | Langgood | G06F 1/3203 713/320 |
| 2010/0058091 A1 * | 3/2010 | Lambert | G06F 1/263 713/330 |

(Continued)

FOREIGN PATENT DOCUMENTS

EP    3595120 A1 *  1/2020  ............ G06F 1/30

*Primary Examiner* — Aurel Prifti
(74) *Attorney, Agent, or Firm* — Larson Newman, LLP

(57) ABSTRACT

A chassis includes power supply units configured to be a primary source of power for several information handling systems. A chassis management controller monitors a power capacity of the power supply units, and sends a measure of first available power of the power supply units to one of the information handling systems. If the power limit of a sled connector is at least equal to the first power requirement of the information handling system, then it may be determined whether a total power available for the information handling system is at least equal to the first power requirement of the one information handling system. If the total power available for the information handling system is at least equal to the first power requirement of the information handling system, then the information handling system may be powered on.

20 Claims, 8 Drawing Sheets

(56) References Cited

U.S. PATENT DOCUMENTS

| | | | |
|---|---|---|---|
| 2011/0066871 A1* | 3/2011 | Farmer | G06F 1/263 713/340 |
| 2011/0118889 A1* | 5/2011 | Singla | H02J 1/10 700/293 |
| 2011/0170223 A1* | 7/2011 | DiMarco | H02H 3/08 361/94 |
| 2012/0200418 A1* | 8/2012 | Hirosaka | G06F 1/266 340/657 |
| 2014/0008979 A1* | 1/2014 | Kinnard | G06F 1/263 307/29 |
| 2015/0006921 A1* | 1/2015 | Shih | G06F 1/263 713/300 |
| 2015/0082055 A1* | 3/2015 | Grout | G06F 1/26 713/300 |
| 2015/0177798 A1* | 6/2015 | Venishetti | G06F 1/3287 713/300 |
| 2015/0177813 A1* | 6/2015 | Bailey | G06F 1/263 713/320 |
| 2016/0179110 A1* | 6/2016 | Rotem | G06F 1/3206 327/538 |
| 2017/0160777 A1* | 6/2017 | Uan-zo-li | G06F 1/266 |
| 2017/0357305 A1* | 12/2017 | Ragupathi | G06F 1/3206 |
| 2018/0173295 A1 | 6/2018 | Cross et al. | |
| 2019/0041937 A1* | 2/2019 | Li | G06F 1/26 |
| 2019/0087295 A1* | 3/2019 | Sultenfuss | G06F 1/263 |
| 2019/0179386 A1* | 6/2019 | Wang | G06F 1/30 |
| 2019/0227611 A1* | 7/2019 | Nam | H02J 1/14 |
| 2019/0238706 A1* | 8/2019 | Sakai | G06F 1/28 |
| 2019/0332155 A1* | 10/2019 | Humphrey | G06F 1/30 |
| 2019/0391628 A1* | 12/2019 | Camiolo | G06F 1/266 |
| 2020/0019223 A1* | 1/2020 | Thibaut | H02J 13/0005 |
| 2020/0076628 A1* | 3/2020 | Yam | G06F 1/30 |
| 2020/0127491 A1* | 4/2020 | Ansett | H02J 9/061 |
| 2020/0133752 A1* | 4/2020 | Ganesan | G06F 11/008 |
| 2020/0142465 A1* | 5/2020 | Jenne | G06F 1/3287 |
| 2020/0204060 A1* | 6/2020 | Atluri | H02H 9/02 |
| 2020/0278732 A1* | 9/2020 | Horvath | G06F 1/18 |
| 2020/0393886 A1* | 12/2020 | Jeanne | H04N 21/4436 |

* cited by examiner

SYSTEM AND METHOD FOR INCREASING POWER DELIVERY TO INFORMATION HANDLING SYSTEMS

FIELD OF THE DISCLOSURE

The present disclosure generally relates to information handling systems, and more particularly relates to increasing power delivery to information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A chassis may include power supply units configured to be a primary source of power for several information handling systems. A chassis management controller monitors a power capacity of the power supply units, and sends a measure of first available power of the power supply units to one of the information handling systems. If the power limit of a sled connector is at least equal to the first power requirement of the information handling system, then it may be determined whether a total power available for the information handling system is at least equal to the first power requirement of the one information handling system. If the total power available for the information handling system is at least equal to the first power requirement of the information handling system, then the information handling system may be powered on.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
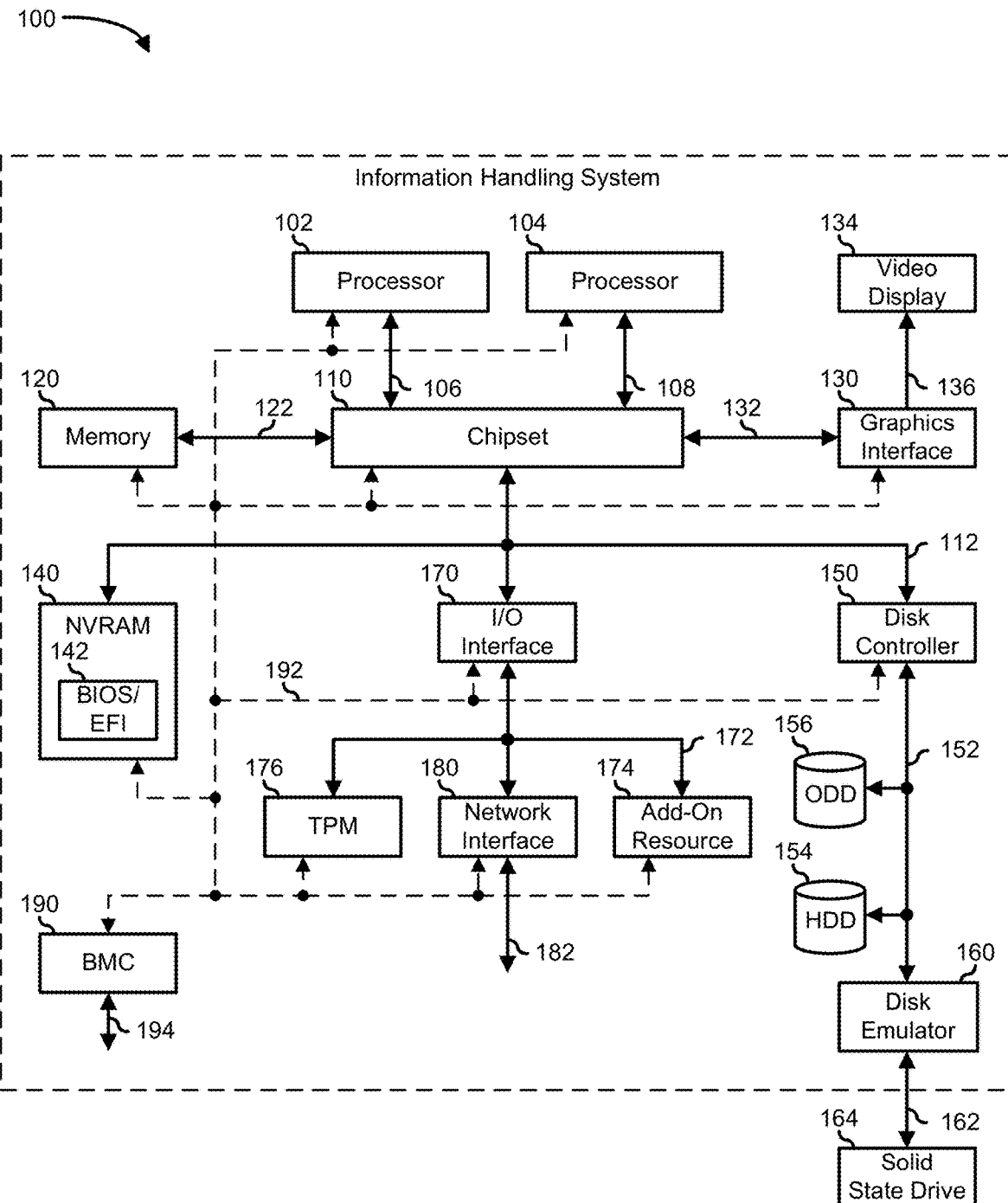
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 also referred to as a service processor or an embedded controller is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an $I^2C$ bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data. Further, while a single information handling system is illustrated in FIG. 1, the term "system" shall also be taken to include any collection of systems or sub-systems that individually or jointly execute a set or multiple sets of instructions to perform one or more computer functions.

Chassis are generally manufactured to support modular information handling systems, also referred to as nodes or sleds. The present system and method allow for increasing power provided to the information handling systems by adding a secondary power source in parallel with an existing, primary power supply unit (PSU) of the chassis. The secondary power source may be integrated into the existing chassis architecture by leveraging the chassis hardware and firmware features.

Figure 2:
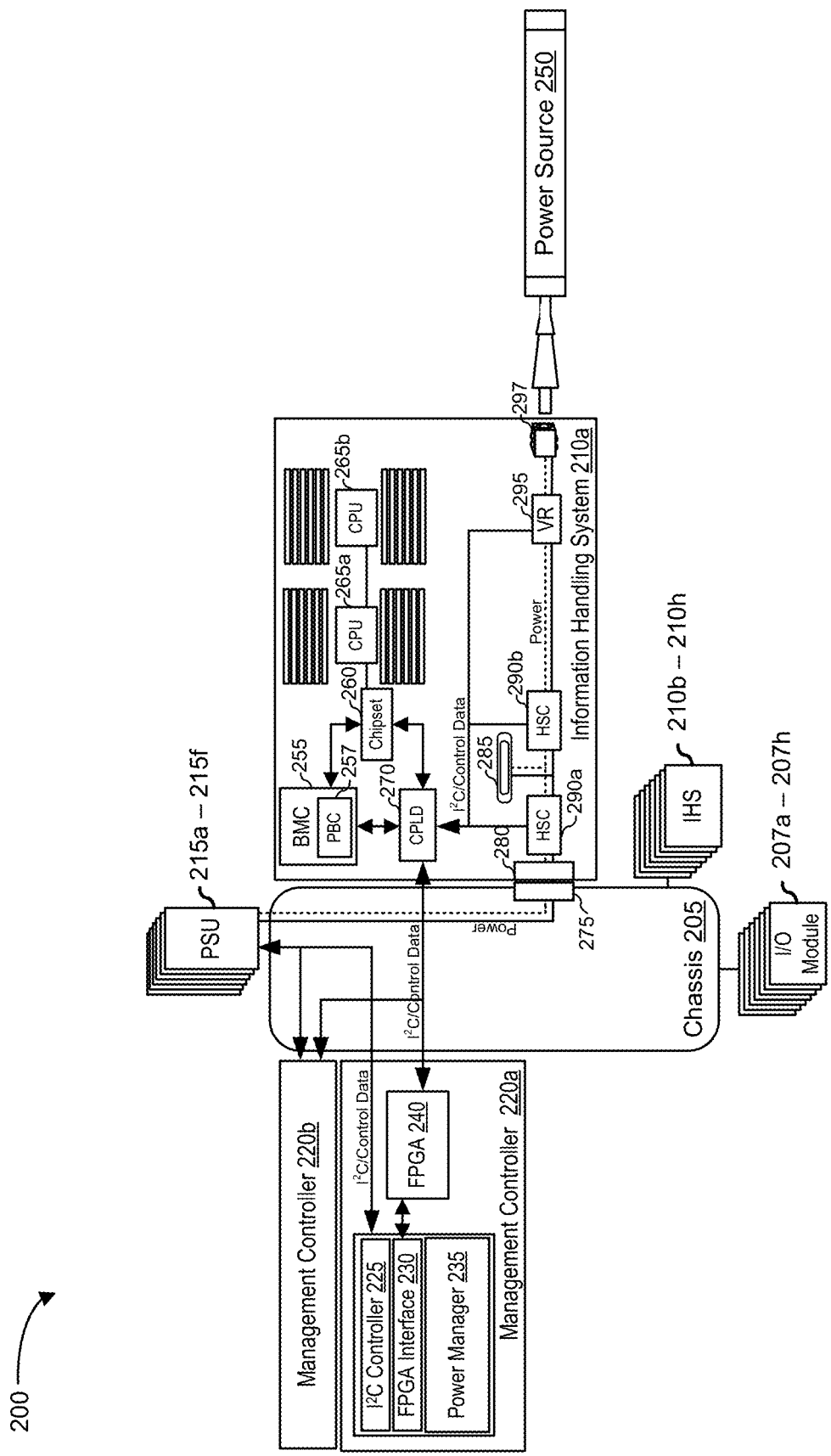
FIG. 2 is a block diagram illustrating an example of a system for increasing power delivery to a modular information handling system in a chassis, according to an embodiment of the present disclosure.

FIG. 2 shows a system 200 for increasing power delivery to a modular information handling system in a chassis. System 200 includes a power source 250 and a chassis 205 that includes multiple modular information handling systems 210a-210h, I/O modules 207a-210h, management controllers 220a-220b, and PSUs 215a-215f. Chassis 205 may include more or less than the components and/or resources that are shown in FIG. 2. As depicted, information handling system 210a includes a BMC 255, a complex programmable logic device (CPLD) 270, a chipset 260, processors 265a-265b, hot-swap controllers 290a-290b, a power interface 285, a voltage regulator 295, and a connector 297. Chipset 260 may be similar to chipset 110 of FIG. 1, while BMC 255, which includes a power budget controller 257, maybe similar to BMC 190 of FIG. 1. In addition, processors 265a-265b may be similar to processor 102 and processor 104 of FIG. 1. Information handling system 210a may be similar to information handling system 100 of FIG. 1 while information handling systems 210b-210h may be similar to information handling system 210a. Similar to chassis 205, information handling system 210a may include more or fewer components and/or resources as shown in FIG. 2.

Chassis 205 may be configured as an enclosure that serves as a container for information handling systems, storage resources, and various other components. Chassis 205 may be constructed from steel, aluminum, plastic, and/or any other suitable material. Although the term chassis is used, chassis 205 may also be referred to as a case, cabinet, tower, box, enclosure, and/or housing. In certain embodiments, chassis 205 may be configured to hold and/or provide power to information handling systems 210a-210h.

PSUs 215a-215f, which are housed by chassis 205, may be configured to provide a primary source of power to information handling systems 210a-210h and the other components of chassis 205. Generally speaking, each one of PSUs 215a-215f may include any system, device, or apparatus configured to supply electrical current to one or more information handling systems 210a-210h, management controllers 220a-220b, storage resources, I/O modules 207a-207h, etc. For example, in some embodiments, each one of PSUs 215a-215f may drive electrical current to a power bus from which information handling systems 210a-210h, management controllers 220a-220b, etc. draw electrical energy for operation. In some embodiments, PSUs 215a-215f may be configured in a redundant configuration, such that in the event of a failure of one of PSUs 215a-215f or failure of an alternating current power source to one or more of PSUs 215a-215f in order to adequately power information handling systems 210a-210h.

Management controller 220a, also referred to as an enclosure controller or a chassis management controller, includes an I²C controller 225, a field-programmable gate array (FPGA) interface 230, a power manager 235, and an FPGA 240. Management controller 220a may be configured to provide out-of-band management facilities for the management of information handling systems 210a-210h, PSUs 215a-215f, and the other components of chassis 205. The management controller 220a may perform said management even if chassis 205 and its components are powered off or powered to a standby state. Management controller 220a may include a processor, a memory, and an out-of-band network interface separate from and physically isolated from an in-band network interface of information handling systems 210a-210h and/or other components. In certain embodiments, management controller 220a may include or maybe a part of a BMC or a remote access controller such as a Dell Remote Access Controller or an iDRAC. In other embodiments, management controller 220a may include or maybe a part of a chassis management controller (CMC) also known as an enclosure management controller.

In some embodiments, management controller 220a may be configured to communicate with each one of PSUs 215a-215f. Each one of PSUs 215a-215f may be configured to communicate I²C/control data and/or telemetry data or signals via I²C controller 225 across a suitable type of management communication media path such as an I²C bus. For example, PSU 215a may communicate information regarding its status and/or health to management controller 220a via I²C controller 225. PSU 215a may also communicate electrical measurements such as electrical current, wattage, and/or voltage. As shown, chassis 205 may include additional management controllers such as management controller 220b which is similar in configuration to management controller 220a, arranged in a redundant fashion, thus allowing failover in the event of a fault in the operation of management controller 220a.

Power manager 235 may be configured to manage power from PSUs 215a-215f or control its operations with FPGA 240. As such, power manager 235 and FPGA 240 may be communicatively coupled to PSUs 215a-215f via FPGA interface 230 and I²C controller 225. I²C controller 225 may be configured to receive I²C/control data and/or telemetry data from PSUs 215a-215f. Based on the I²C/control data and/or telemetry data received, power manager 235 may determine or identify the maximum, sustained, and/or minimum power capacities of each one of PSUs 215a-215f. Power manager 235 may also determine the total or collective maximum, minimum, and/or sustained power capacities of PSUs 215a-215f. In addition, management controller 220a may determine a power limit of each connector to information handling systems 210a-210h. For example, management controller 220a may determine the power limit of connector 275 which may be a sled connector that connects power from PSUs 215a-215f to information handling system 210a. The power limit of connector 275 may be similar to the power limit of connector 280 which connects information handling system 210a to connector 275.

Power manager 235 may transmit I²C/control data and/or telemetry data such as a measure of minimum, sustained, and/or maximum power capacity. Power manager 235 may also transmit a minimum, sustained, and/or maximum available power, etc. of PSUs 215a-215f to CPLD 270 via FPGA 240 through a single wire serial interface. Power manager 235 may also transmit a measure of a power limit such as the measure of the power limit of connector 275. In addition, power manager 235 may also transmit a signal that indicates whether the maximum available power of PSUs 215a-215f is within specifications. The signal may also indicate whether PSUs 215a-215f are healthy. The signal may be de-asserted by power manager 235 or FPGA 240 prior to the PSUs 215a-215f entering the fail state.

I/O modules 207a-207h may include any system, device, or apparatus configured to facilitate communication between information handling systems 210a-210h and a user interface device, such as a keyboard, a mouse, or a display. I/O modules 207a-207h may also be configured to facilitate communication between information handling systems 210a-210h and another information handling system external to chassis 205, such as wherein I/O modules 207a-207h may include network interface cards or switches.

System 200 shows a system that allows connection from a secondary power source, such as power source 250 which may be external to information handling system 210a and/or chassis 205. In other embodiments, there may be additional power sources for information handling system 210a other than PSUs 215a-215f and power source 250. For example, information handling system 210a may have a third or a fourth power source.

Power source 250 may provide power to information handling system 210a and/or information handling systems 210b-210h in addition to the power provided from PSUs 215a-215f of chassis 205. Power source 250 may provide power in parallel with the power provided from PSUs 215a-215f. Power source 250 may be connected by a power cable to the front of information handling system 210a. In another embodiment, power source 250 may be connected to information handling system 210a via one of I/O modules 207a-207h which are located in the back the chassis 205. Power source 250 may also be connected to information handling system 210a via a mezzanine card with power connection capabilities. Mezzanine cards may be interfaces between the information handling system 210a-210h and I/O modules 207a-207h.

Power source 250 may be a PSU configured to provide a secondary power source for information handling system 210a. In one embodiment, power source 250 may include a battery configured to convert stored chemical energy into electrical power. In another embodiment, power source 250 may include a capacitor configured to store electrical power and deliver such electrical power to information handling system 210a. In yet some embodiments, power source 250 may represent power drawn from a typical alternating circuit wall outlet.

In some embodiments, power source 250 may be communicatively coupled to BMC 255 via CPLD 270 through a systems management interface such as an I²C bus, an SMBus, or a PMBus allowing BMC 255 to receive health and status information from and/or communicate commands to power source 250. In particular, power budget controller 257 may receive the aforementioned health and status information. Power source 250 may also communicate electrical measurements such as electrical current, wattage, and/or voltage to BMC 255 or to power budget controller 257, in particular. In some embodiments, power source 250 may provide energy to a plurality of information handling systems in addition to information handling system 210a. While it is shown that power source 250 is external to chassis 205 and information handling system 210a, in other embodiments, power source 250 may be internal to chassis 205 or information handling system 210a. Power source 250 may be needed to enable information handling system 210a to reach sustained and/or maximum performance when the power needs of information handling system 210a exceed the sustained and/or maximum available power from PSUs 215a-215f. If power source 250 is unhealthy, failed or is otherwise removed, then information handling system 210a may operate within the capacity of the maximum available power from chassis 205.

BMC 255 may be configured to provide out-of-band management facilities for the management of information handling system 210a even if information handling system 210a is powered off or powered to a standby state. BMC 255 may include a processor, a memory, and an out-of-band network interface separate from and physically isolated from an in-band network interface of information handling system 210a and/or other resources of information handling system 210a. In some embodiments, BMC 255 or power budget controller 257 in particular, may be configured to receive I²C/control data and/or telemetry data directly from power source 250. In another embodiment BMC 255 or power budget controller 257 in particular may be configured to receive I2C/control data and/or telemetry data indirectly from power source 250 via CPLD 270. Based on the received I²C/control data and/or telemetry data, BMC 255 or power budget controller 257 in particular, may determine, calculate, and/or identify various values such as the maximum, minimum, and sustained power requirements of information handling system 210a. The maximum power requirement of information handling system 210a indicates a throttle boundary that still allows peak power excursions that can be achieved to prevent overconsumption of power from PSUs 215a-215f, possibly resulting in a PSU shutdown event. The minimum power requirement of information handling system 210a indicates the lowest amount of power that information handling system 210 may consume when it is at 100% utilization and maximum throttling is applied. The sustained power requirement of information handling system 210a indicates a throttle boundary that still allows peak power excursions.

BMC 255 or power budget controller 257, in particular, may determine, calculate, and/or identify the sustained and maximum power capacity of power source 250. The sustained power capacity of power source 250 may be the amount of power that power source 250 can provide when operating at typical or rated capacity. The maximum power capacity of power source 250 may be the amount of power that power source 250 can provide when operating in a maximum operational state such as full capacity, allowing for brief excursions above the sustained or rated capacity of the power source. Also, power source 250 may communicate information regarding its status and/or health. In addition, power source 250 may also communicate information and/or measurements of its electrical parameters such as electrical current, wattage or voltage. The aforementioned information may be utilized by power budget controller 257 during the power budgeting analysis and/or calculations.

In addition, BMC 255 or power budget controller 257 may receive I²C/control data and/or telemetry data associated with chassis 205 from management controller 220a and FPGA 240 via CPLD 270. For example, BMC 255 or power budget controller 257 may receive the measure of the maximum or sustained power available. Also, BMC 255 or power budget controller 257 may receive I²C/control data and/or telemetry data associated with voltage regulator 295 from CPLD 270. For example, BMC 255 or power budget controller 257 the input and output power limits of voltage regulator 295 such as the input and output, current, wattage, and/or voltage limits of voltage regulator 295. The data may be used by BMC 255 in its power monitoring, power budgeting, power management, and/or power limiting functions.

Power budget controller 257 may be configured to perform various processes related to power monitoring, power budgeting, power limit, and/or power management of information handling system 210a. For example, power budget controller 257 may perform calculations associated with the above functions such as to calculate the maximum available power from chassis 205 and/or power source 250, a delta between the maximum available power from chassis 205 and the minimum power requirement of information handling system 210a among others. Although power budget controller 257 is shown as a firmware located within BMC 255, power budget controller 257 may be a system, device or apparatus external to BMC 255. In addition, BMC 255 may not include power budget controller 257 and the functions and features associated with power budget controller 257 may be performed by BMC 255 instead.

Voltage regulator 295 may include any system, device, or apparatus configured to control the output voltage of power source 250. Voltage regulator 295 may be coupled between the output of power source 250 at connector 297 and hot-swap controller 290b. In addition, voltage regulator 295 may be communicatively coupled to BMC 255 via CPLD 270. In some embodiments, voltage regulator 295 may be configured to communicate control and/or telemetry data to BMC 255 via CPLD 270. For example, voltage regulator 295 may communicate information regarding its status and health. Voltage regulator 295 may also communicate information and/or measurements of electrical parameters of power received from power source 250 such as the electrical current, wattage, or voltage output. BMC 255 may also set the power and/or voltage limits of voltage regulator 295. For example, BMC 255 may communicate the power and/or voltage requirements of information handling system 210a to voltage regulator 295. Voltage regulator 295 may be configured to adjust its outputs, such as output voltage based on the voltage requirement that is communicated by BMC 255.

CPLD 270 may be configured to monitor the available power from chassis 205 and power source 250 with BMC 255. Further, CPLD 270 may be configured to sum up the maximum available power from chassis 205 and power source 250, which is the total available maximum power for information handling system 210a. CPLD 270 may then communicate the total available maximum power to BMC 255 that may be used by power budget controller 257 in performing power budget calculations. CPLD 270 may also be configured, with BMC 255, to determine and take corrective action, such as throttling information handling system 210a, when power source 250 is about to enter a fail state or there is an issue with the power from chassis 205. CPLD 270 may receive power limits associated with information handling system 210a from either Management Controller 220a, BMC 255 or both. Power limits may be the amount of power that information handling system 210a may be limited to use. CPLD 270 may then transmit the power limits to chipset 260 which may be configured to set registers in processors 265a-265b according to the power limits. CPLD 270 may modify power limits sent to chipset 260 based on the health of power source 250. As such, processors 265a-265b may limit power utilization based on the power limits. In one embodiment, chipset 260 may be a platform controller hub (PCH). Power source 250 may have a signal that indicates when its power capacity is within specifications. The signal may be de-asserted by the power source 250 prior to entering the fail state. CPLD 270 may transmit the signal or its de-assertion to BMC 255.

Hot-swap controllers 290a-290b may be configured to be in communication with CPLD 270 for controlling power to information handling system 210a via power interface 285. Hot-swap controllers 290a-290b may be configured to provide I²C/control data and/or telemetry data such as current, voltage, power, and temperature readback to CPLD 270. In addition, the PSUs 215a-215f and power source 250 may provide information associated with its health, sustained power capacity, maximum power capacity and/or minimum power capacity via CPLD 270. The health and capacity information of PSUs 215a-215f provided to CPLD 270 may be abstracted by power manager 235 into another form such as a power limit indicating to the information handling system 210a how much power from the chassis 205 it may consume through connectors 275 and 280. In particular, hot-swap controller 290a may be configured to control power from PSUs 215a-215f. While hot-swap controller 290b may be configured to control power from power source 250.

BMC 255 may utilize the information from hot-swap controllers 290a-290b for managing the power from PSUs 215a-215f and power source 250. For example, BMC 255 may implement power monitoring, power limiting, and/or power capping features. BMC 255 may be configured to communicate I²C/control data and/or telemetry data to information handling system 210a via chipset 260. The information communicated may be associated with the sustained power, maximum power and/or minimum power available for information handling system 210a. Chipset 260 may be configured to control or limit the power utilization of processors 265a-265b based on the communicated information. In addition, BMC 255 may provide reports associated with various statistics associated with the current, the voltage, the power, the temperature, etc. of PSUs 215a-215f and power source 250.

Information handling system 210a may include a storage resource configured to store data. The storage resource may include one or more hard disk drives, magnetic tape libraries, optical disk drives, magneto-optical disk drives, solid-state storage drives, compact disk drives, compact disk arrays, disk array controllers, and/or any other systems, apparatuses, or devices configured to store data. The storage resource may be communicatively coupled to one or more resources of information handling system 210a such as BMC 255 and/or one or more resources of chassis 205 such as management controller 220a.

Information handling system 210a may be configured to include additional resources, such as more processors, memory, etc. In addition, the processors may include an enhanced processing feature. The enhanced processing feature allows the processors to run faster than base operating frequencies if the workload demands additional performance. Because of the additional resources and/or enhanced processing feature during an increased workload, the information handling system's power requirement may increase dynamically until a maximum power requirement is reached. When the workload is decreased, the information handling system 210a's power requirement may automatically decrease.

The actual power that information handling system 210a may consume at any point in time may be above the power capacity of PSUs 215a-215f. For example, each of information handling systems 210b-210h may be drawing maximum power from PSUs 215a-215f as well. The present disclosure enables information handling system 210a to be powered by a combined power from both a primary power source, such as PSUs 215a-215f and a secondary power source, such as power source 250. For example, PSUs 215a-215f may supply electrical power with a particular voltage, such as 12.2 volts, to connector 275 which is routed to the main power rail via a first hot-swap controller such as hot-swap controller 290a. Power source 250 can supply electrical power to information handling system 210a. In some embodiments, the electrical power supplied by power source 250 can have a higher voltage, such as 20 volts, than the voltage of the electrical power from PSUs 215a-215f.

Thus, a programmable voltage regulator, such as voltage regulator 295 may be used to stabilize the voltage level to the particular voltage. For example, power source 250 feeds into voltage regulator 295 that has a variable output voltage such as 12 volts to 12.5 volts. Power source 250 may power information handling system 210a with voltage regulator 295 in a constant voltage mode until the maximum effective output capacity of power source 250 is reached, and then voltage regulator 295 may enter a constant current mode. After power source 250 is operating at its maximum effective capacity, information handling system 210a may source its sustained power and maximum power requirements also referred to as peak power requirement from PSUs 215a-215f. BMC 255 may set the limits of the voltage regulator 295 and hot-swap controllers 290a-290b to safely deliver power to information handling system 210a within the maximum power capacity of PSUs 215a-215f and power source 250.

The present disclosure also includes two power limiting solutions when information handling system 210a can pull more power than the sled connector, such as connector 275 and/or connector 280 are designed to deliver. The first solution is to decrease the feature that limits the electrical power from chassis 205 to information handling system 210a. This feature may be the lesser between the maximum, minimum, or sustained power capacity of PSUs 215a-215 and the power limit of connector 275 and/or connector 280 to prevent physical damage to the connectors when the primary power source is the sole source of power resulting in a maximum, minimum, or sustained available power for the information handling system 210. The second solution is to increase the aforementioned feature such as the maximum, minimum, or sustained available power to information handling system 210a with the maximum, minimum, or sustained available power from the secondary power source. This enables information handling system 210a to reach maximum performance even if the power from the primary power source cannot support the power requirement of information handling system 210a. The available power may be the power capacity of the power source or the power as limited in transmitting the power source to an information handling system, by component or resource such as a connector, whichever is less.

Figure 3:
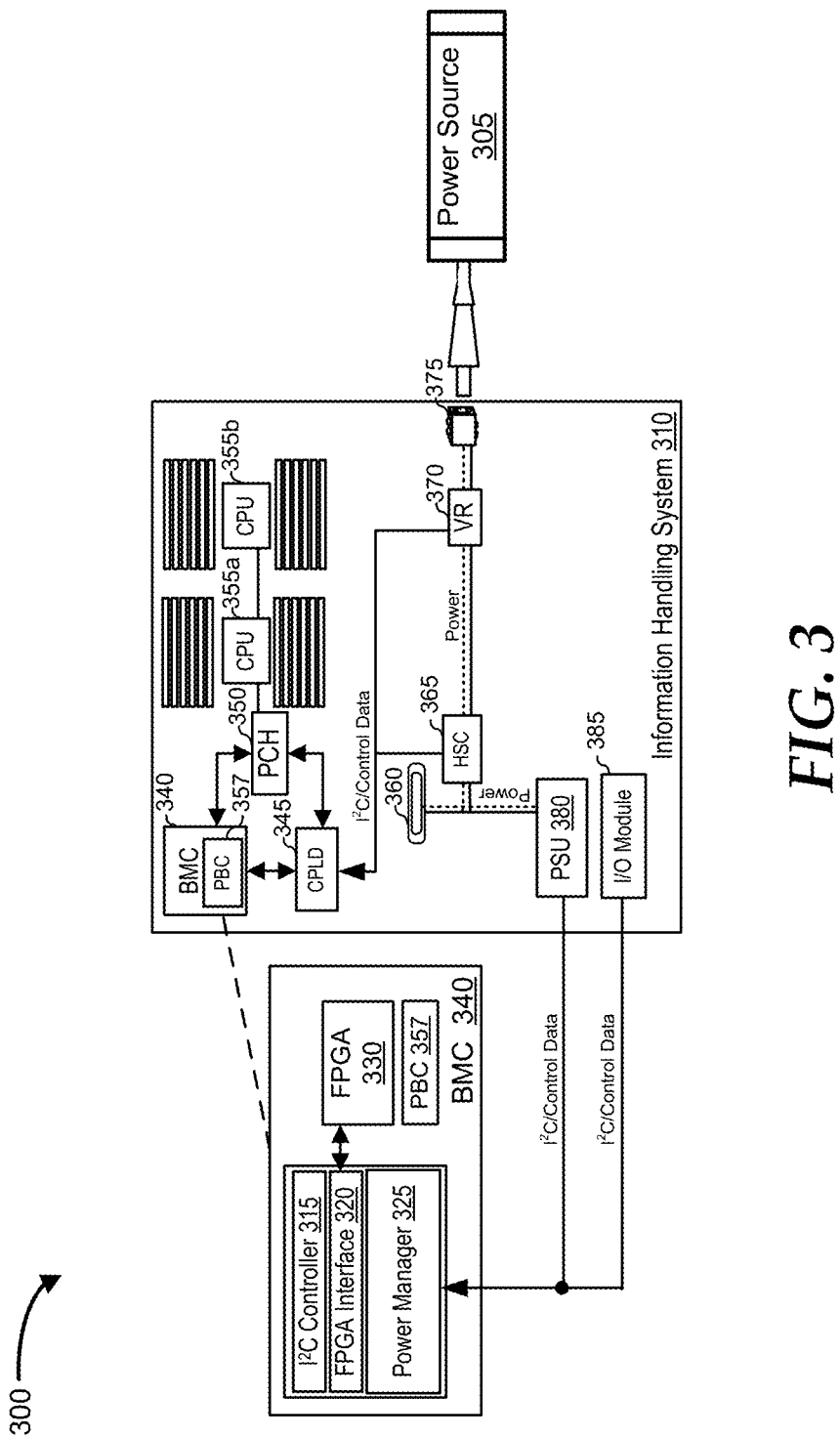
FIG. 3 is a block diagram illustrating an example of a system for increasing power delivery to a monolithic information handling system, according to an embodiment of the present disclosure.

FIG. 3 illustrates a system 300 that enables a monolithic information handling system to draw power from a combined primary and secondary power sources. System 300 includes a power source 305 and an information handling system 310 which is similar to information handling system 210a of FIG. 2. Information handling system 310 includes a BMC 340, a chipset 350, a CPLD 345, processors 355a-355b, a power interface 360, hot-swap controller 365, a voltage regulator 370, a connector 375, a PSU 380, and an I/O module 385. BMC 340 includes an I²C controller 315, an FPGA interface 320, a power manager 325, an FPGA 330, and a power budget controller 257. Power connector 375, which is similar to connector 297, connects power source 305 to information handling system 310. Power interface 360 is similar to power interface 285 of FIG. 2 while hot-swap controller 365 is similar to hot-swap controller 290b. In addition, voltage regulator 370 is similar to voltage regulator 295 of FIG. 2 while I/O module 385 is similar to I/O modules 207a-207h of FIG. 2

BMC 340, which is similar to BMC 255 of FIG. 2, may further be configured to include various features of management controller 220a of FIG. 2. BMC 340 may be configured to provide out-of-band management facilities for the management of information handling system 310 which may be performed even if information handling system 310 is powered off or powered to a standby state. BMC 340 may include a processor, a memory, and an out-of-band network interface separate from and physically isolated from an in-band network interface of information handling system 310 and/or other components. Further, BMC 340 may be configured to communicate with PSU 380 and power source 305. PSU 380 and power source 305 may be configured to communicate control and/or telemetry data or signals via I²C controller 315 through CPLD 345, which is similar to CPLD 270 of FIG. 2, across a suitable type of management communication media path such as an I²C bus. For example, PSU 380 and power source 305 may communicate information regarding its status and/or health. PSU 380 and power source 305 may also communicate electrical measurements such as electrical current, wattage, and/or voltage. In addition, PSU 380 and power source 305 may communicate its sustained and maximum power capacity. In addition, BMC 340 may be configured to determine, based on the power requirements of information handling system 310 it's minimum, maximum, and sustained power requirements.

Power manager 325, which is similar to power manager 235 of FIG. 2, may be configured to manage power from PSU 380 and power source 305. Power manager 325 may receive I²C/control data and/or telemetry data from PSU 380 and power source 305 via I²C controller 315. Power manager 325 with power budget controller 357 may perform the power budget analysis based on the control data from PSU 380 and power source 305. Power manager 325 may then communicate information associated with the power budget analysis to CPLD 345 via FPGA 330, which is similar to FPGA 240 of FIG. 2. FPGA 330 may be communicatively coupled with power manager 325 and I²C controller 315, similar to I²C controller 225 of FIG. 2 via FPGA interface 320 which is similar to FPGA interface 230 of FIG. 2. CPLD 345 may then communicate the information to chipset 350 which is similar to chipset 260 of FIG. 2. Chipset 350 may provide power limits to processors 355a-355b which are similar to processors 265a-265b of FIG. 2. The information may include the sustained and maximum power capacity of PSU 380 and power source 305.

PSU 380 which is similar to PSUs 215a-215f, may be configured to be the primary source of power to information handling system 310. Generally speaking, PSU 380 may include any system, device, or apparatus configured to supply electrical current to information handling system 310. In some embodiments, information handling system 310 may include an additional PSU in a redundant configuration to PSU 380, such that in the event of a failure of PSU 380 the redundant PSU may provide the primary source of power to information handling system 310.

Power source 305 which is similar to power source 250 may be configured to be the secondary power source for information handling system 310. Generally speaking, power source 305 may include any system, device, or apparatus configured to supply electrical current to information handling system 310. PSU 380 and power source 305 may be communicatively coupled to BMC 340 via a systems management interface such as an I²C bus, an SMBus, or a PMBus allowing BMC 340 to receive health and status information from and/or communicate commands to PSU 380 and power source 305.

The actual power that information handling system 310 may consume at any point in time may be above the power capacity of PSU 380. In this instance, information handling system 310 may be configured to be powered by a combined power from the primary power source and the secondary power source if the secondary power source is healthy.

Figure 4:
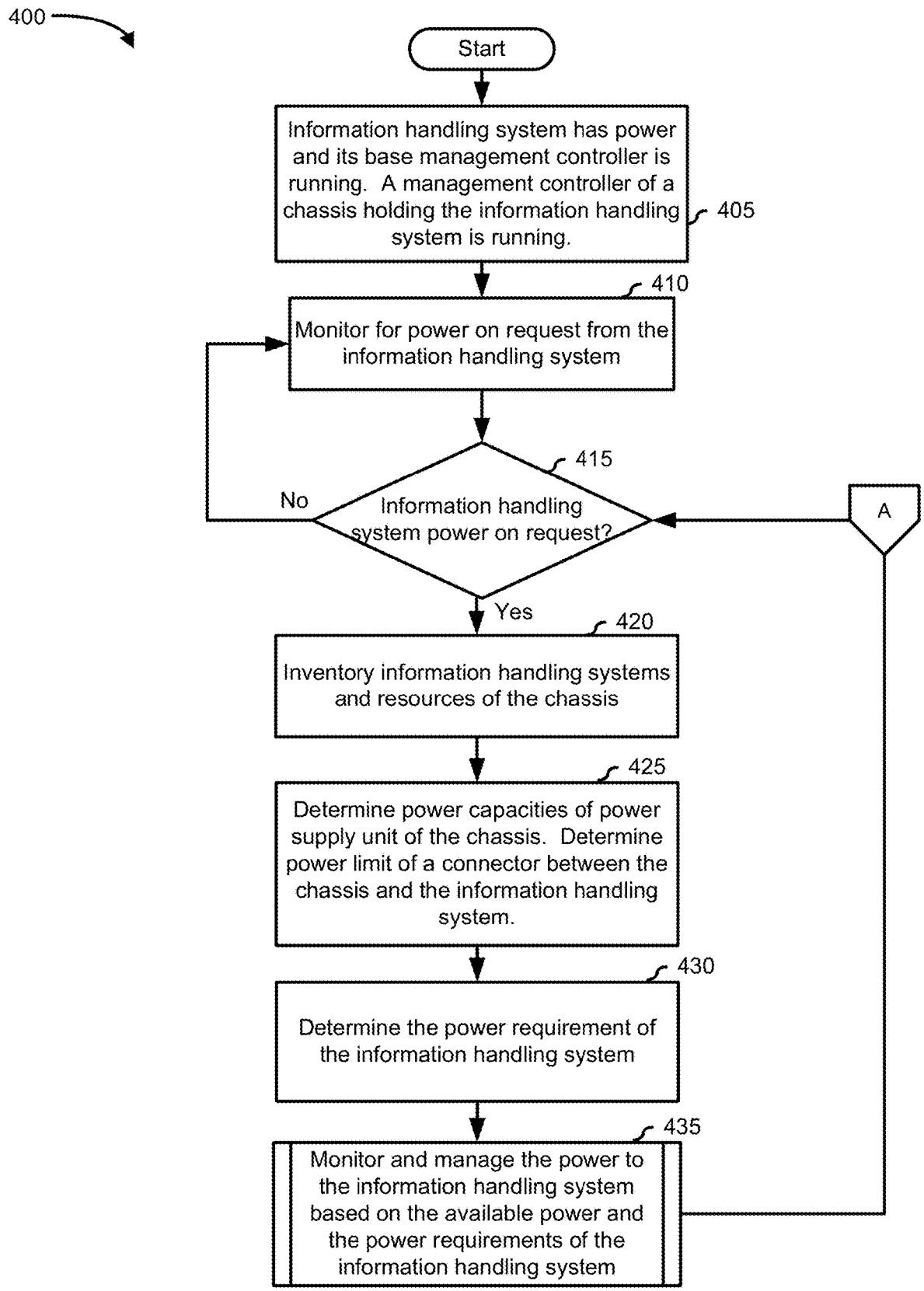
FIG. 4 is a flowchart illustrating an example of a method for increasing power delivery to an information handling system, according to an embodiment of the present disclosure.

FIG. 4 illustrates a method 400 for enabling an information handling system to consume combined power from a primary power source and a secondary power source. Method 400 enables an information handling system to consume more power than a primary power source can provide. For example, if the information handling system is a modular information handling system in a chassis, method 400 enables the information handling system to consume more power than the chassis can provide while maintaining backward compatibility with the existing chassis architecture. Method 400 may be implemented using embedded controllers similar to management controllers 220a-220b and BMC 255 of FIG. 2 and/or BMC 340 of FIG. 3 or any other resource operable to implement method 400. Method 400 typically starts at block 405.

At block 405, the information handling system has power and its BMC is running. In addition, the management controller of the chassis holding the information handling system is also running. In an embodiment, the information handling system may just have been placed in the chassis. The power into the information handling system may be from a PSU in the chassis which is the information handling system's primary power source or from a secondary power source. The method proceeds to block 410, where the method monitors the information handling system for power-on request which may be transmitted by the BMC to the management controller.

The method proceeds to decision block 415, where the method determines whether a power-on request is received from the information handling system. If a power-on request is received from the information handling system, then the "YES" branch is taken and the method proceeds to block 420. If the power-on request is not received from the information handling system, then the method loops back to block 410.

At block 420, the method may inventory the components and/or resources of the chassis such as the PSUs and the information handling systems. The inventory may be performed by the management controller and the BMC. The method proceeds to block 425 where the method determines the sustained and maximum power capacity of the PSUs based on the inventory. The method may also determine the sustained and maximum power available to the information handling system based on the capacity of the PSU and its current load. The sustained and maximum power available to the information handling system may also be based on the power limit of the sled connector between the chassis and the information handling system. For example, the maximum power available be the lesser value between the maximum power capacity and the power limit of the sled connector. The aforementioned determinations may be performed by the management controller.

The method proceeds to block 430 where the method may also determine the power requirements such as the minimum, sustained, and maximum power requirements of the information handling system. The method may also determine the minimum, sustained, and maximum power capacity of the secondary power source of the information handling system. Block 430 may be performed by a BMC or an embedded controller.

The method may proceed to process block 435 where the method monitors and manages the power requirements of the information handling system. The method may also perform power budget calculations associated with the management of the power requirements of the information handling system. The method may perform the power budget calculations based on the power requirements of the information handling system and the power capacities and/or available power from the primary and secondary power sources. The calculations may also be based on the power limit of one or more connectors. Process block 435 includes sub-process blocks 555 and 565 of FIG. 5.

Process block 435 determines the power budgeting and allocation of power to determine if there is enough power to power-on and support the operations of the information handling system. Process block 435 may prevent the information handling system from powering on if its minimum power requirement or sustained power requirement exceeds the power limit of the connector that connects the information handling system to the chassis and/or power source. The power limit of the said connector is the maximum power that may pass through the connector without physically damaging the connector. However, this approach may not allow a feature-rich information handling system to power-on. For example, if the minimum power requirement of the information handling system is greater than the power limit of the connector, the information handling system may not be powered on.

Process block 435 may also determine the sustained and maximum power requirement of the information handling system. The current disclosure may enable the information handling system to power-on if the power limit of the connector is greater than or equal to the minimum power requirement of the information handling system. Process block 435 may be performed by the management controller and/or the BMC periodically. For example, process block 435 may be performed every particular number of seconds, milliseconds, etc. until a power-off request is received from the information handling system, and then the method proceeds to decision block 415.

Figure 5:
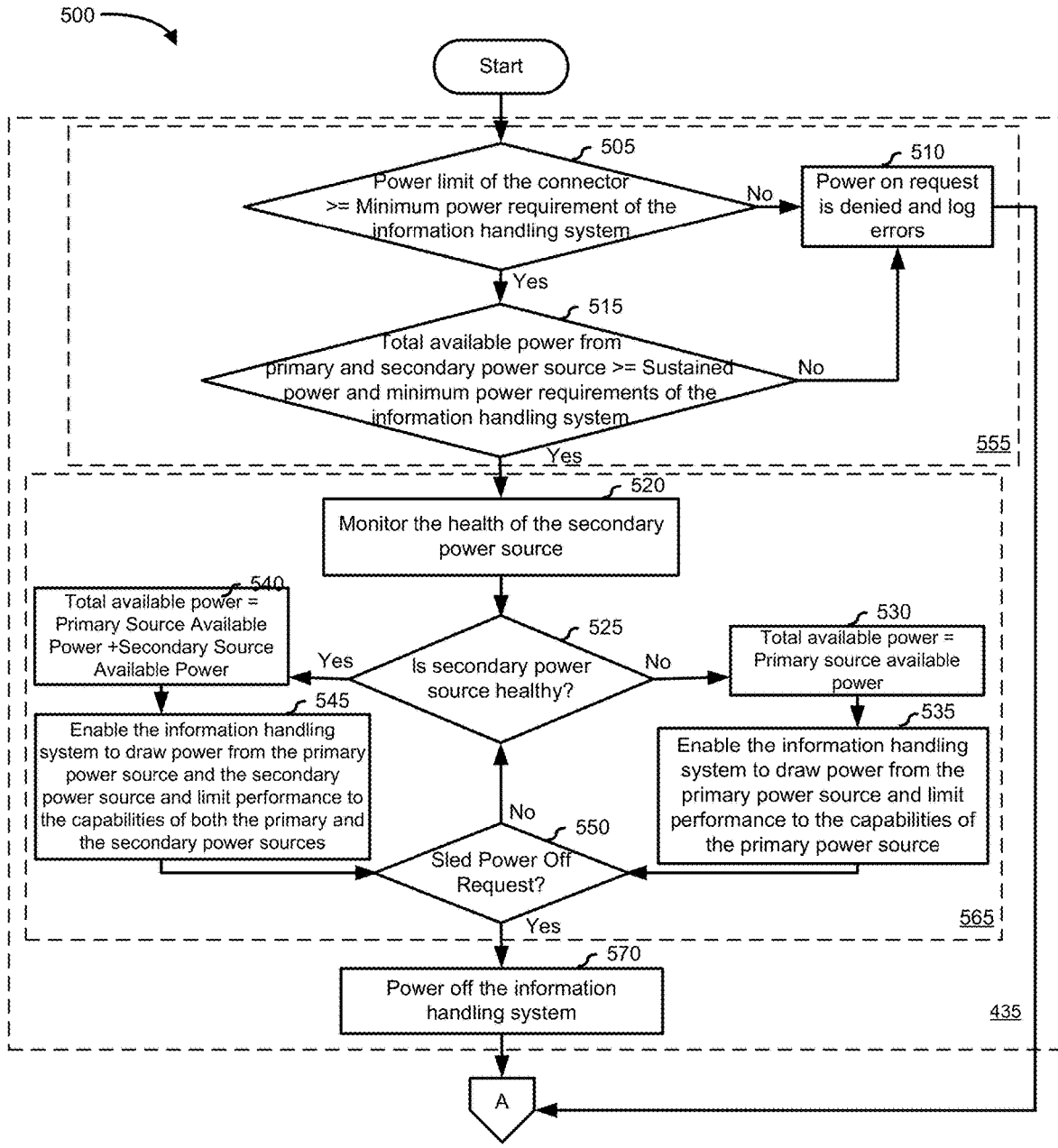
FIG. 5 is a flowchart illustrating an example of a method for monitoring and managing power to an information handling system, according to an embodiment of the present disclosure.

FIG. 5 shows a method 500 which is a detailed illustration of process block 435 of FIG. 4. Method 500 typically starts at sub-process block 555 which includes block 510 and decision blocks 505 and 515. Sub-process block 555 performs the power budget calculations for operating the information handling system and decides whether the information handling system can be safely powered on. Sub-process block 555 typically starts at decision block 505 where the method determines whether the power limit of the connector is greater than or equal to the minimum power requirement of the information handling system. If the power limit of the connector is greater than or equal to the minimum power requirement of the information handling system, then the "YES" branch is taken and the method proceeds to decision block 515. If the power limit of the connector is less than the minimum power requirement of the information handling system, then the "NO" branch is taken and the method proceeds to block 510. At block 510, the method denies the power-on request of the information handling system and logs error associated with the denial. Block 510 may be performed by the management controller and or the BMC. The method proceeds to decision block 415 of FIG. 4.

At decision block 515, the method may determine whether the total power available from the primary power source and the secondary power source is greater than or equal to the sustained power and minimum power requirements of the information handling system. The total power available may be the sum of the maximum power capacity of the primary power source and the maximum power capacity of the secondary power source. If the total power available is greater than or equal to the sustained power and minimum power requirements of the information handling system, then the "YES" branch is taken and the method proceeds to block 520. At this point, the information handling system can be safely powered on. If the total power available is less than the sustained power and minimum power requirements of the information handling system, then the "NO" branch is taken and the method and proceeds to block 510. In another embodiment, the method may use the maximum power requirement of the information handling system instead of the sustained power requirement. In yet another embodiment, the method may use the maximum power capacity, the sustained power capacity or the sustained power available from the primary and secondary power sources instead of the maximum power available from the aforementioned.

After determining that it is safe to power-on the information handling system, the method proceeds to sub-process 565 wherein the method performs the power limit calculations for operating the information handling system after it is powered on. Sub-process 565 includes blocks 520, 540, 545, 530, and 535. Sub-process 565 also includes decision blocks 525 and 550. Sub-process 565 may be performed periodically until a power-off request from the information handling system is received. For example, sub-process 565 may be performed based on a time interval determined by the manufacturer or the administrator such as every particular number of milliseconds or seconds.

At block 520, the management controller monitors the health of the secondary power source. For example, the management controller may query the secondary power source for its health and/or status information. In another embodiment, the management controller may periodically receive health and/or status information from the secondary power source. The method proceeds to decision block 525 where the method determines if the secondary power source is healthy. If the secondary power source is healthy, then the "YES" branch is taken and the method proceeds to block 540. If the secondary power source is not healthy, then the "NO" branch is taken and the method proceeds to block 530.

At block 540, the method calculates the current sustained and maximum available power from the primary power source and the secondary power source. The current sustained available power from the primary power source may be the current sustained power capacity of the primary power source as limited by the power limit of the connector. In other words, the current sustained available power from the primary power source may be the lesser between the current sustained capacity of the primary power source and the power limit of the connector. The method proceeds to block 545 where the method enables the information handling system to draw power from both the primary power source and the secondary power source and limit performance to the capabilities of the primary and secondary power sources. The method may also monitor the information handling system to detect if there is a power-off request from the information handling system. The method proceeds to decision block 550.

At block 530, the method calculates the current sustained and maximum available power from the primary power source. The method proceeds to block 535 where the method enables the information handling system to draw power from the primary power source and limit performance of the information handling system to the capabilities of the primary power source. This limiting can be achieved through methods such as throttling or applying power limits. The method may also monitor the information handling system to detect if there is a power-off request from the information handling system. The method proceeds to decision block 550. In blocks 540 and 530, the method performs the calculations based on the current sustained and maximum power available from the primary power source and the secondary power source. In another embodiment, the method may perform the calculations based only on the sustained power available from the primary and secondary power sources. In yet another embodiment, the power capacity of the secondary power source may be limited by a power limit of a connector or other component or resource.

At decision block 550, the method determines whether there is a power-off request from the information handling system. The management controller may wait for or detect a power-off request from the BMC. In another embodiment, the management controller may query the BMC to determine if there is a power-off request. If there is a power-off request or power shutdown request from the information handling system, then the "YES" branch is taken and the method proceeds to block 570 where the method powers down the information handling system. After powering down the information handling system, the method proceeds to block 410 of FIG. 4. If there is no power-off request from the information handling system, then the "NO" branch is taken and the method proceeds to decision block 525.

Although FIG. 4 and FIG. 5 illustrates method 400 and method 500 for increasing power delivery to each modular information handling system in a chassis, those skilled in the art will appreciate that method 400 and method 500 may be performed to increase power delivery to a monolithic information handling system. Accordingly, the BMC or the embedded controller may perform functions performed by the management controller of the chassis.

Figure 6A:
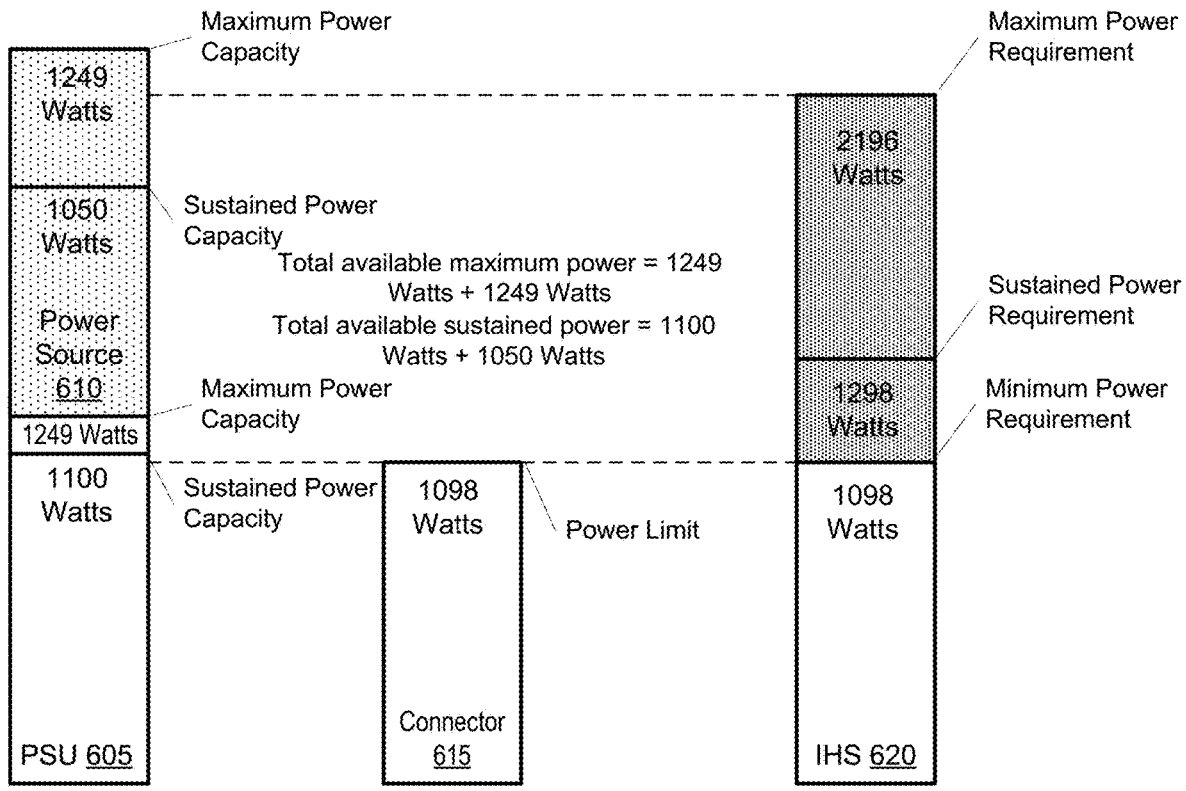
FIGS. 6A-6E are block diagrams illustrating examples of budgeting power for an information handling system, according to an embodiment of the present disclosure.

FIG. 6A shows a breakdown of budget calculations for an information handling system with a power requirement that is greater than the power that a primary power source could safely deliver. The budget calculations may incorporate a power limiting feature for the information handling system referred herein as a total available power for the information handling system. The total available power may be also referred to as a total available maximum power. In another embodiment, the total available power may be the total available sustained power. The total available maximum power may be the sum of the maximum available power of the power sources that the information handling system can draw power from. However, the total available maximum power may be limited based on the power limits of one or more components such as a connector(s) where power is transmitted through for the information handling system. The power limit of the component may be the maximum power that can pass through the connector without damaging the component.

The budget calculations may also incorporate the power requirements of the information handling system which may be based on the components of the information handling system such as the number of processors, memory, etc. A highly configured information handling system has more processors, memory, etc. requires more power than a less configured information handling system. If the power available from the primary source of power is less than the power requirement of the information handling system, then the said power may be augmented by an additional power available from a secondary power source. This allows the information handling system to reach full utilization or performance.

As shown in FIG. A, information handling system 620 may have a maximum power requirement of 2,196 watts, a minimum power requirement of 1,098 watts, and a sustained power requirement of 1,298 watts. Also shown is a PSU 605, which is a primary source of power for information handling system 620. PSU 605 may have a maximum power capacity of 1,249 watts and a sustained or rated power capacity of 1,100 watts. The maximum power capacity may be the power generated by a power source allowing for short peak power excursions. The sustained power capacity may be the average amount of power generated by the power source. In addition, power source 610, which is a secondary power source for information handling system 620, has a maximum power capacity of 1,249 watts and a sustained power capacity of 1,050 watts. Connector 615, which is a sled connector that connects power from PSU 605 to information handling system 620, has a power limit of 1,098 watts. Power from PSU 605 is drawn via connector 615. As shown, the sustained available power for information handling system 620 is 1,100 watts from PSU 605 and 1050 watts from power source 610. PSU 605 can provide the lesser power between the sustained power capacity of PSU 605 and the power limit of connector 615. Thus, PSU 605 can provide 1,098 watts of power to information handling system 620.

Figure 6B:
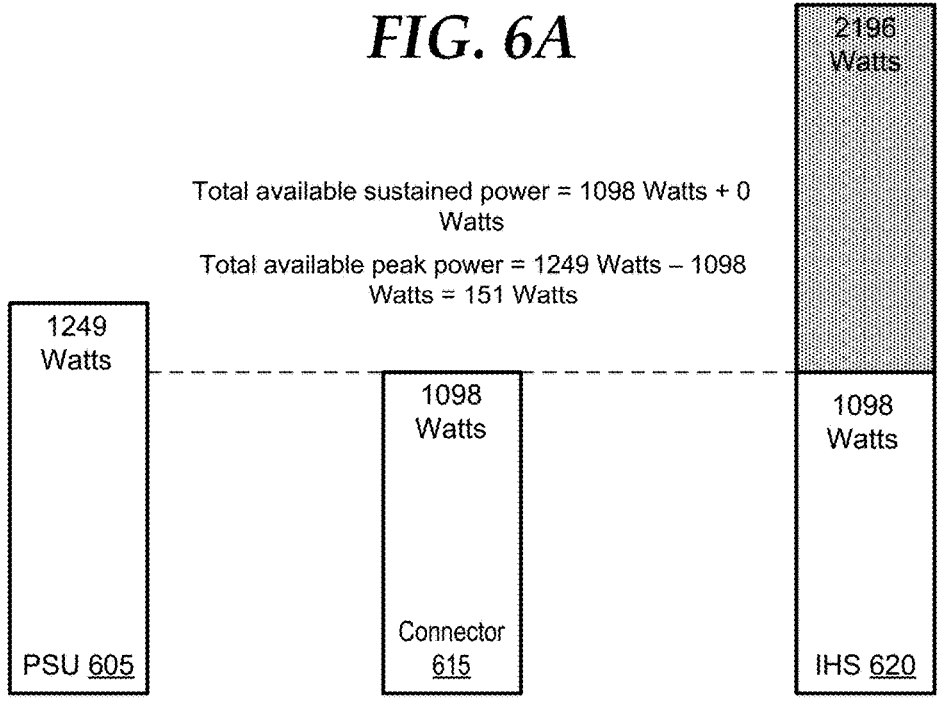

At this point, information handling system 620 may be safely powered on, because the sustained available power from PSU 605 is greater than or equal to the minimum power requirement of the information handling system 620 and the maximum power capacity available from PSU 605 and power source 610 is greater than or equal to the sustained and maximum power requirement of information handling system 620. If the secondary power source, that is power source 610, failed as shown in FIG. 6B, the information handling system would still be able to operate and would be limited to the sustained power capacity of PSU 605 or the power limit of connector 615. The information handling system may be guaranteed a power consumption to 1,100 watts which is the sustained power capacity of PSU 605 or the 1,098 watts which is the power limit of connector 615. The information handling system may have a performance degradation as it will only be able to consume 151 watts (maximum power capacity of PSU605−power limit of connector 615) of peak power, which is less than its requested 200 watts (sustained power requirement−minimum power requirement) but the information handling system would not shut down.

Figure 6C:
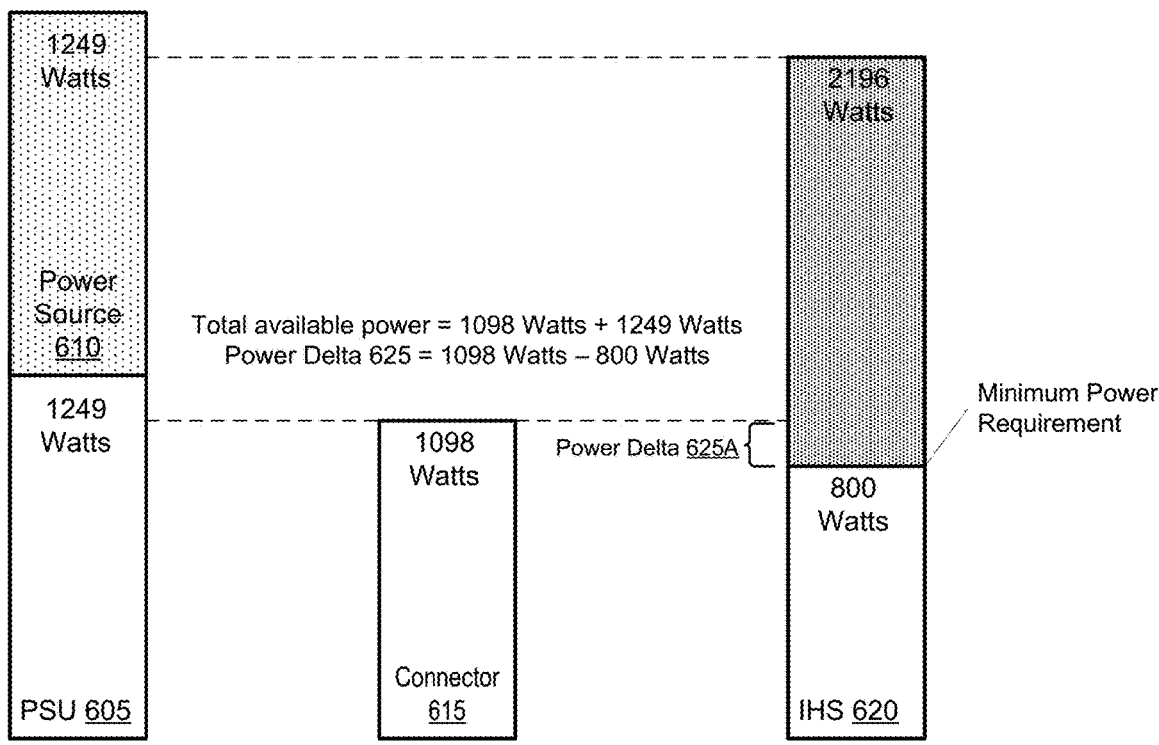
Figure 6D:
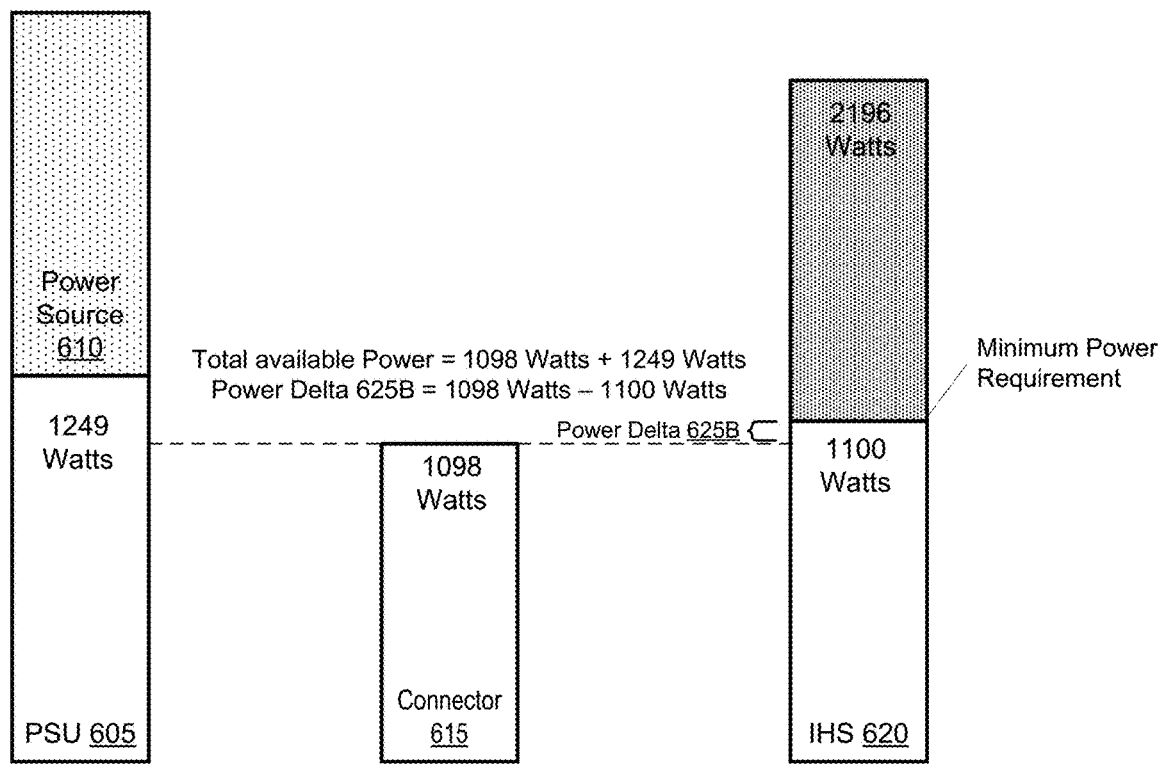

As shown in FIG. 6C, the minimum power requirement of information handling system 620 is 800 watts which is less than the total available power from PSU 605 and power source 610. Also shown is a power delta 625 of 298 watts between the minimum power requirement and the maximum available power from PSU 605. Based on the above, information handling system 620 may be safely powered on. However, in FIG. 6D, the minimum power requirement of information handling system 620 is 1,100 watts while the maximum power available from PSU 605 as limited by the power limit of connector 615 is 1,098 watts. Here there is a power delta 625B of −2 watts. Thus, information handling system 620 may not be safely powered on because if the secondary power source becomes unhealthy, the information handling system would draw all its power requirements from the primary power source through the connector, thus limiting sustained power consumption from the primary power source to the power limit of the connector. Because there is no guarantee that the information handling system would draw power that is less than the power limit of the connector, the connector may sustain damage.

Figure 6E:
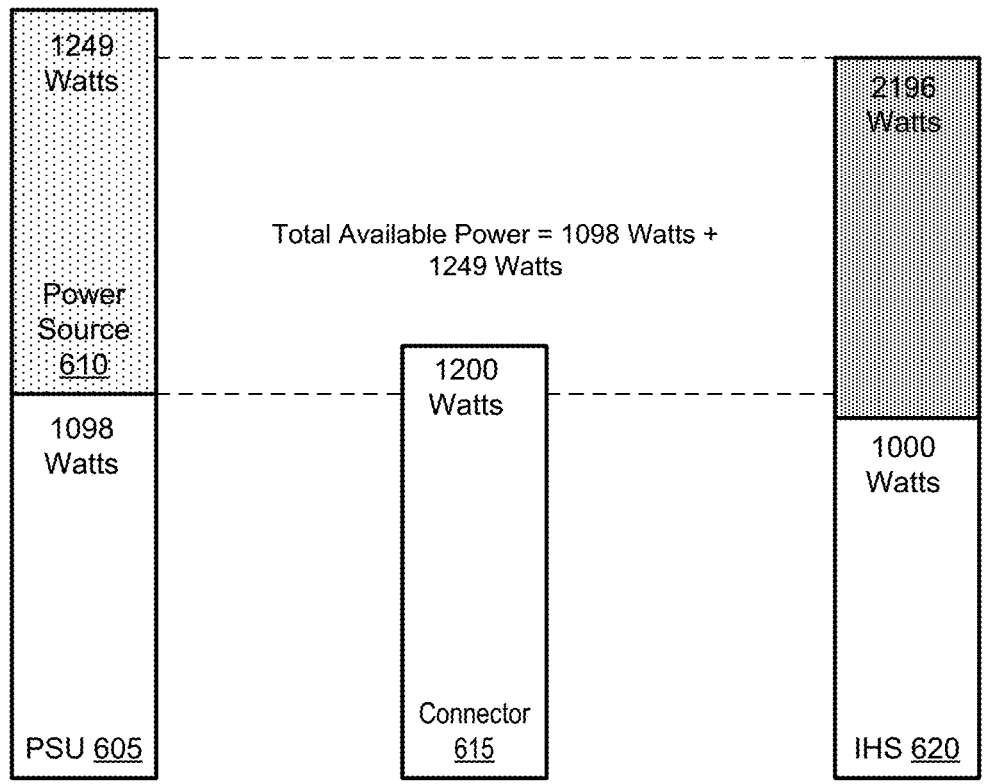

As shown in FIG. 6E, the maximum available power for information handling system 620 includes 1,098 watts from PSU 605 because it is lower than the power limit of connector 615 which is 1,200 watts. In addition, the maximum available power for information handling system includes 1,249 watts from power source 610, assuming that there is no power limit from a connector between power source 610 and information handling system 620. In another embodiment, the power limit from the said connector is equal to or greater than 1,249 watts. As such, information handling system 620 may be powered on.

If the minimum power requirement of the information handling system is less than the power limit of the connector but the sustained and maximum power requirements of the information handling system is above the power limit of the connector, the information handling system would be allowed to power on and have a certain amount of peak power consumption. That is the peak power consumption may be based on the workload of the information handling system and may be above the minimum power requirement and less than or equal to the maximum power requirement. The amount of peak power consumption that the information handling system would be allowed to have may depend on whether the secondary power source is healthy or not. If the secondary power source is healthy, then the peak power consumption may be equal to the maximum power requirement. The peak power requirement may be more than the maximum power requirement for a short period if the primary power source and the secondary power source could support it. If the secondary power source is not healthy, the information handling system is limited to consuming power such that its average consumption is not above the power limit of the connector.

The calculations shown in FIGS. 6A-6E are based on total power available for the information handling system. In other embodiments, the calculations may be based on the minimum power available or the sustained power available for the information handling system. In addition, the present disclosure is not limited to the calculations shown herein, as various other power budgeting calculations may be performed as deemed appropriate during manufacture and/or by the administrator. For example, the administrator may not power-on the information handling system unless there is enough available power for the maximum power requirement of the information handling system.

Although FIG. 4, and FIG. 5 show example blocks of method 400 and method 500 in some implementation, method 400 and method 500 may include additional blocks, fewer blocks, different blocks, or differently arranged blocks than those depicted in FIG. 4 and FIG. 5. Additionally, or alternatively, two or more of the blocks of method 400 may be performed in parallel. For example, block 425 and block 430 of may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   determining, by a service processor, a power requirement of an information handling system;
   determining whether a power limit of a connector between the information handling system and a first power source is less than or equal to the power requirement of the information handling system;
   subsequent to determining that the power limit of the connector is less than or equal to the power requirement of the information handling system, comparing the power requirement of the information handling system with a total available power, wherein the total available power is a sum of a first available power from the first power source and a second available power from a second power source, wherein the first available power is based on a lesser of a first power capacity of the first power source and the power limit of the connector;
   determining whether the total available power is at least equal to the power requirement of the information handling system; and
   responsive to determining that the total available power is at least equal to the power requirement of the information handling system:
      allowing the information handling system to power on;
      determining whether the second power source is healthy; and
      responsive to determining that the second power source is healthy, enabling the information handling system to draw the first available power from the first power source and the second available power from the second power source.

2. The method of claim 1, wherein the power limit is a maximum power that can pass through the connector without damaging the connector.

3. The method of claim 1, wherein the power requirement is a maximum throttled power required by the information handling system at full utilization.

4. The method of claim 1, further comprising determining whether the total available power is at least equal to a particular power requirement.

5. The method of claim 4, wherein the particular power requirement is a sustained power required by information handling system at typical utilization.

6. The method of claim 1, further comprising determining whether a power-on request is received from the information handling system.

7. The method of claim 6, further comprising responsive to determining that the total available power is less than the power requirement of the information handling system, denying the power-on request of the information handling system.

8. The method of claim 1, further comprising monitoring the information handling system to detect a power shutdown request of the information handling system.

9. The method of claim 8, further comprising responsive to detecting the power shutdown request, shutting down the information handling system and monitoring the information handling system to detect a power-on request of the information handling system.

10. A chassis, comprising:
    a plurality of power supply units configured to be a primary source of power for a plurality of information handling systems; and
    a chassis management controller communicatively coupled to the information handling systems, the chassis management controller configured to:
       monitor a first power capacity of the power supply units; and
       send a measure of a first available power of the power supply units to a service processor of one of the information handling systems, wherein the measure of the first available power is the first power capacity of the power supply units that is limited by a power limit of a sled connector between the chassis and the one information handling system;
    wherein the service processor, responsive to a power-on request from the one information handling system, is configured to:
       when the power limit of the sled connector is at least equal to a first power requirement of the one information handling system, then determine whether a total power available for the one information handling system is at least equal to the first power requirement of the one information handling system, wherein the total power available is a sum of the first available power of the power supply units and a second power capacity of a secondary power source of the one information handling system; and
       when the total power available for the one information handling system is at least equal to the first power requirement of the one information handling system, then allow the one information handling system to power-on.

11. The chassis of claim 10, wherein the service processor is further configured to, subsequent to the power-on request of the one information handling system, determine whether the secondary power source is healthy.

12. The chassis of claim 11, wherein the service processor is further configured to, responsive to a determination that the secondary power source is healthy, enable the one information handling system to draw the first available power from the power supply units and the second power capacity from the secondary power source.

13. The chassis of claim 10, wherein the first power capacity of the power supply units is at full capacity of the power supply units.

14. The chassis of claim 10, the service processor is further configured to determine whether the total power available for the one information handling system is at least equal to a second power requirement of the one information handling system.

15. The chassis of claim 10, the service processor is further configured to monitor the one information handling system to detect a power shutdown request from the one information handling system.

16. The chassis of claim 10, wherein the secondary power source is in parallel with the power supply units.

17. A method comprising:

when a power-on request from an information handling system is detected by a service processor, then determining whether a power limit of a connector between the information handling system and a first power source is less than or equal to a first power requirement of the information handling system;

when the power limit of the connector is less than or equal to the first power requirement, then determining whether a total available power for the information handling system is at least equal to the first power requirement and a second power requirement of the information handling system, wherein the total available power is a sum of a first power available from the first power source and a second power available from a second power source;

when the total available power for the information handling system is at least equal to the first power requirement and the second power requirement of the information handling system, allowing the information handling system to power on and then determining whether the second power source is healthy; and when the second power source is healthy, then drawing the first power available from the first power source and the second power available from the second power source.

18. The method of claim 17, wherein the first power available from the first power source is based on a power capacity of the first power source and the power limit of the connector.

19. The method of claim 17, further comprising responsive to the determining that the second power source is unhealthy, drawing power from the first power source.

20. The method of claim 17, further comprising responsive to the determining that the second power source is unhealthy, limiting sustained power consumption from the first power source to the power limit of the connector.

* * * * *